United States Patent [19]

Simmons

[11] Patent Number: 5,438,887
[45] Date of Patent: Aug. 8, 1995

[54] ELECTRO-HYDRAULIC INTERLOCK SYSTEM FOR A TRANSMISSION

[75] Inventor: Gerald P. Simmons, Morton, Ill.

[73] Assignee: Caterpillar Inc., Peoria, Ill.

[21] Appl. No.: 155,319

[22] Filed: Nov. 22, 1993

[51] Int. Cl.$^6$ ............................................. B60K 41/28
[52] U.S. Cl. ...................................... 74/335; 477/906
[58] Field of Search ....................... 74/866, 867, 868; 364/424.1

[56] References Cited

U.S. PATENT DOCUMENTS

| | | | |
|---|---|---|---|
| 4,827,806 | 5/1989 | Long et al. | |
| 4,833,613 | 5/1989 | Mack et al. | 74/866 X |
| 4,922,425 | 5/1990 | Mack et al. | 74/866 X |
| 5,056,022 | 10/1991 | Witkowski et al. | 74/866 X |
| 5,063,813 | 11/1991 | Lentz | |
| 5,129,274 | 7/1992 | Vukovich et al. | |
| 5,138,838 | 8/1992 | Crosser | |
| 5,251,733 | 10/1993 | Falck et al. | 74/866 X |

*Primary Examiner*—Dirk Wright
*Attorney, Agent, or Firm*—J. W. Burrows

[57] ABSTRACT

In many transmission control systems, electro-hydraulic valves have been used to condition the various clutches in the transmission. It is desirable to have a system where the clutches remain engaged in the event of an electrical malfunction in the system. In the subject invention, a separate electro-hydraulic interlock system is provided to control each one of a plurality of hydraulically actuated speed and directional clutches. Each of the electro-hydraulic interlock systems includes a pilot operated valve which operates to proportionally control one of the hydraulically actuated clutches in response to receipt of a pilot signal from an electro-hydraulic proportional valve that is proportionally controlled in response to a first electrical control signal. A solenoid operated valve is also provided to selectively communicate the pressurized fluid from the one hydraulically actuated clutch to a pressure responsive section of the electro-hydraulic proportional valve so that in the event of an electrical failure in the system, the pressurized fluid from the one hydraulically actuated clutch acts on the pressure responsive section holding the electro-hydraulic proportional valve in the fluid passing condition. This holds the pilot operated valve in a position to maintain the one hydraulically actuated clutch engaged.

5 Claims, 4 Drawing Sheets

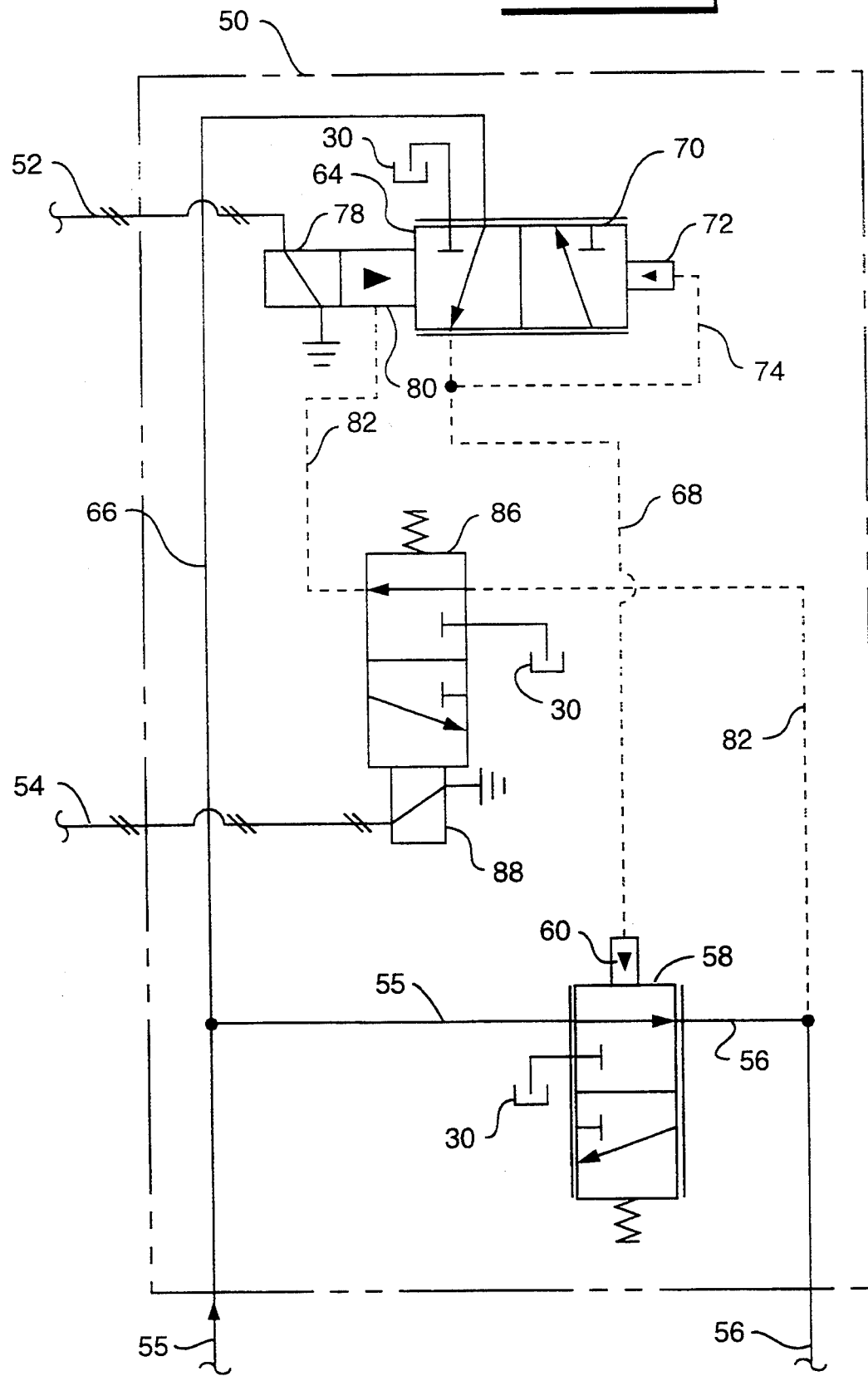

ELECTRO-HYDRAULIC INTERLOCK SYSTEM FOR A TRANSMISSION

TECHNICAL FIELD

This invention relates generally to a transmission control system and more particularly to an electro-hydraulic interlock system for a transmission.

BACKGROUND ART

It is well known to have control arrangements that automatically place a transmission in neutral if the electrical or hydraulic systems malfunction. Likewise, there are electro-hydraulic power arrangements that automatically condition the transmission to a preestablished speed ratio whenever an electrical malfunction occurs with a transmission being operated in a selected range of ratios. Also known are electro-hydraulic servo systems in which the output from the servo system is either hydraulically or mechanically locked in the event that the electrical input signal to the servo system varies from a predetermined range of values. It is desirable to provide a simple hydraulic interlock that maintains the transmission in the selected speed ratio in the event there is a malfunction in the system's electrical energy.

The present invention is directed to overcoming one or more of the problems as set forth above.

DISCLOSURE OF THE INVENTION

In one aspect of the present invention, an electro-hydraulic interlock system is provided for use in a control system of a transmission having hydraulically actuated speed and directional clutches. The control system of the transmission includes a source of pressurized fluid, a reservoir, and an electronic controller receiving energy from a source of electrical energy to produce first and second electrical control signals. The control system is operative in response to a command input to selectively control one of the hydraulically actuated speed or directional clutches in the transmission. The electro-hydraulic interlock system includes a pilot operated valve having a pressure responsive actuator section. The pilot operated valve is interposed in flow controlling relationship between the source of pressurized fluid and the one hydraulically actuated clutch. An electro-hydraulic proportional valve is also provided and has a valving element operative to control fluid flow thereacross. The electro-hydraulic proportional valve is interposed between the source of pressurized fluid and the pressure responsive actuator section of the pilot operated valve and is operative in response to a force generated by the first electrical control signal from the electronic controller to direct thereacross a pilot signal that is proportional to the first electrical control signal to control movement of the pilot operated valve. The electro-hydraulic proportional valve also has a first pressure responsive section responsive to the pressurized fluid downstream thereof to bias the valving element in opposition to the force generated by the first electrical control signal and a larger second pressure responsive section that is selectively responsive to the pressurized fluid in the one hydraulically actuated clutch. The second pressure responsive section is operative to bias the valving element in the same direction as the force generated by the first electrical control signal. The electro-hydraulic interlock system further includes a solenoid operated valve interposed between the second pressure responsive section and the one hydraulically actuated clutch. The solenoid operated valve is selectively movable in response to a second electrical control signal from the electronic controller to a position providing open fluid communication between the larger second pressure responsive section and the one hydraulically actuated clutch.

The present invention provides an electro-hydraulic interlock system that effectively ensures that in the event of an electrical malfunction in the system, the transmission is maintained in the gear that it is operating in at the time the malfunction occurred. The subject arrangement is both a simple arrangement and a reliable interlock system.

BRIEF DESCRIPTION OF THE DRAWINGS

FIG. 4 is a schematic representation of the embodiment of FIG. 3 following a loss of electrical energy in the system.

BEST MODE FOR CARRYING OUT THE INVENTION

Figure 1:
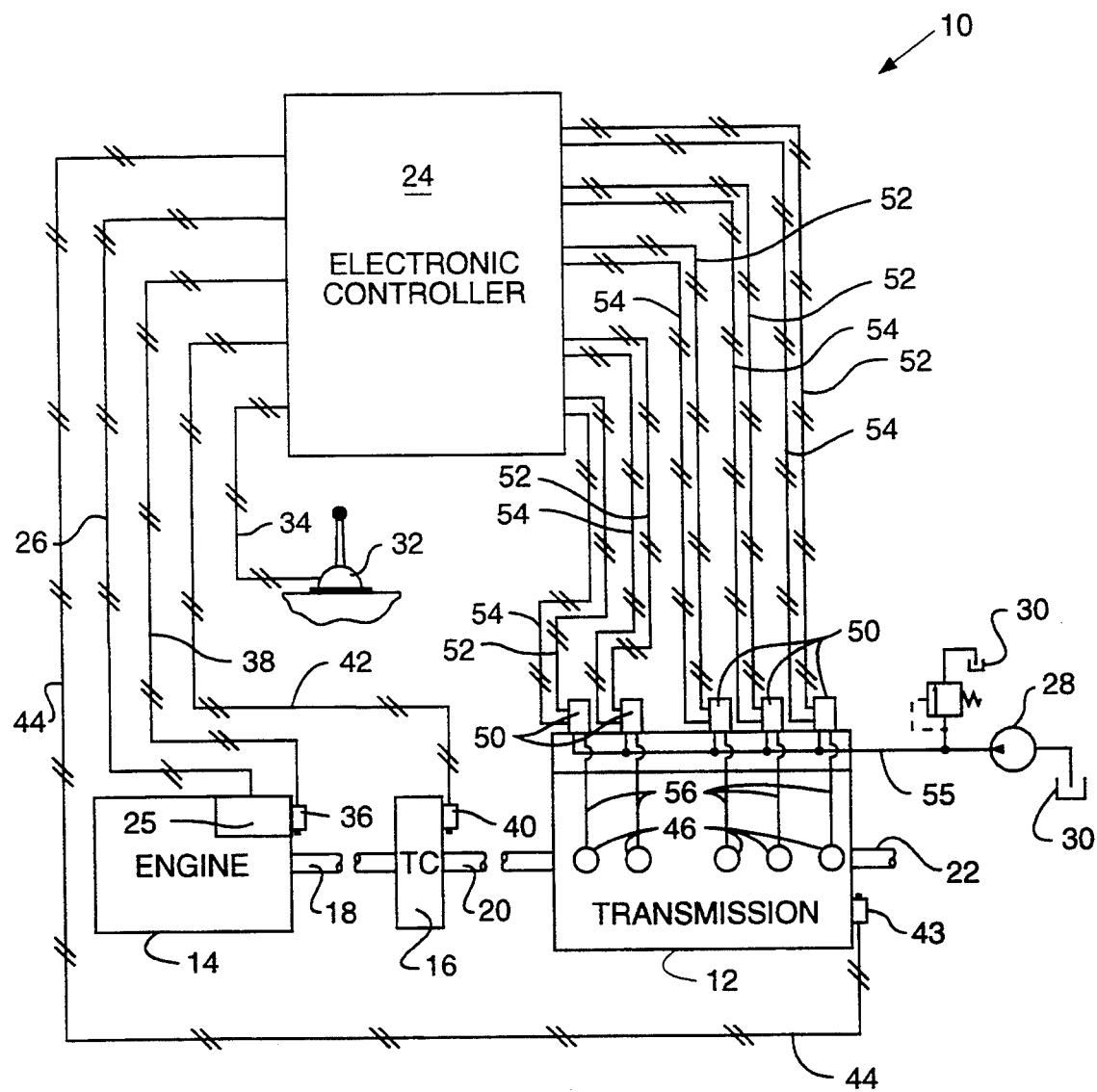
FIG. 1 is a partial diagrammatic and partial schematic representation of a control system for a transmission incorporating an embodiment of the present invention.

Referring to the drawings, and more specifically to FIG. 1, a control system 10 for a transmission 12 is illustrated for use in a machine (not shown) having an engine 14 drivingly connected to a torque converter 16 by a shaft 18 and another shaft 20 drivingly connected between the torque converter 16 and the transmission 12. Output power from the transmission 12 is transmitted therefrom by an output shaft 22.

The control system 10 includes an electronic controller 24, a source of electrical energy 25 connected to the electronic controller 24 by an electrical connection 26, a source of pressurized fluid 28 which receives fluid from a reservoir 30, and a command input device 32 connected to the electronic controller 24 by an electrical connection 34. A speed sensor 36 is connected to the electronic controller 24 by an electrical connection 38 and is operative to sense the rotational speed of the shaft 18. A speed sensor 40 is connected to the electronic controller 24 by an electrical connection 42 and is operative to sense the rotational speed of the shaft 20. A speed sensor 43 is connected to the electronic controller 24 by an electrical connection 44 and is operative to sense the rotational speed of the shaft 22.

The transmission 12 has a plurality of hydraulically actuated speed and directional clutches 46. Each clutch of the plurality of hydraulically actuated speed and directional clutches 46 is controlled by an electro-hydraulic interlock system 50. The electronic controller 24 generates first and second electrical control signals which are directed to the respective electro-hydraulic interlock systems 50 by electrical connections 52,54 respectively. Likewise, each of the electro hydraulic interlock systems 50 is connected to the source of pressurized fluid 28 via a fluid conduit 55. A fluid conduit 56 connects each of the electro-hydraulic interlock systems 50 with respective ones of the plurality of hydraulically actuated speed and directional clutches 46.

Figure 2:
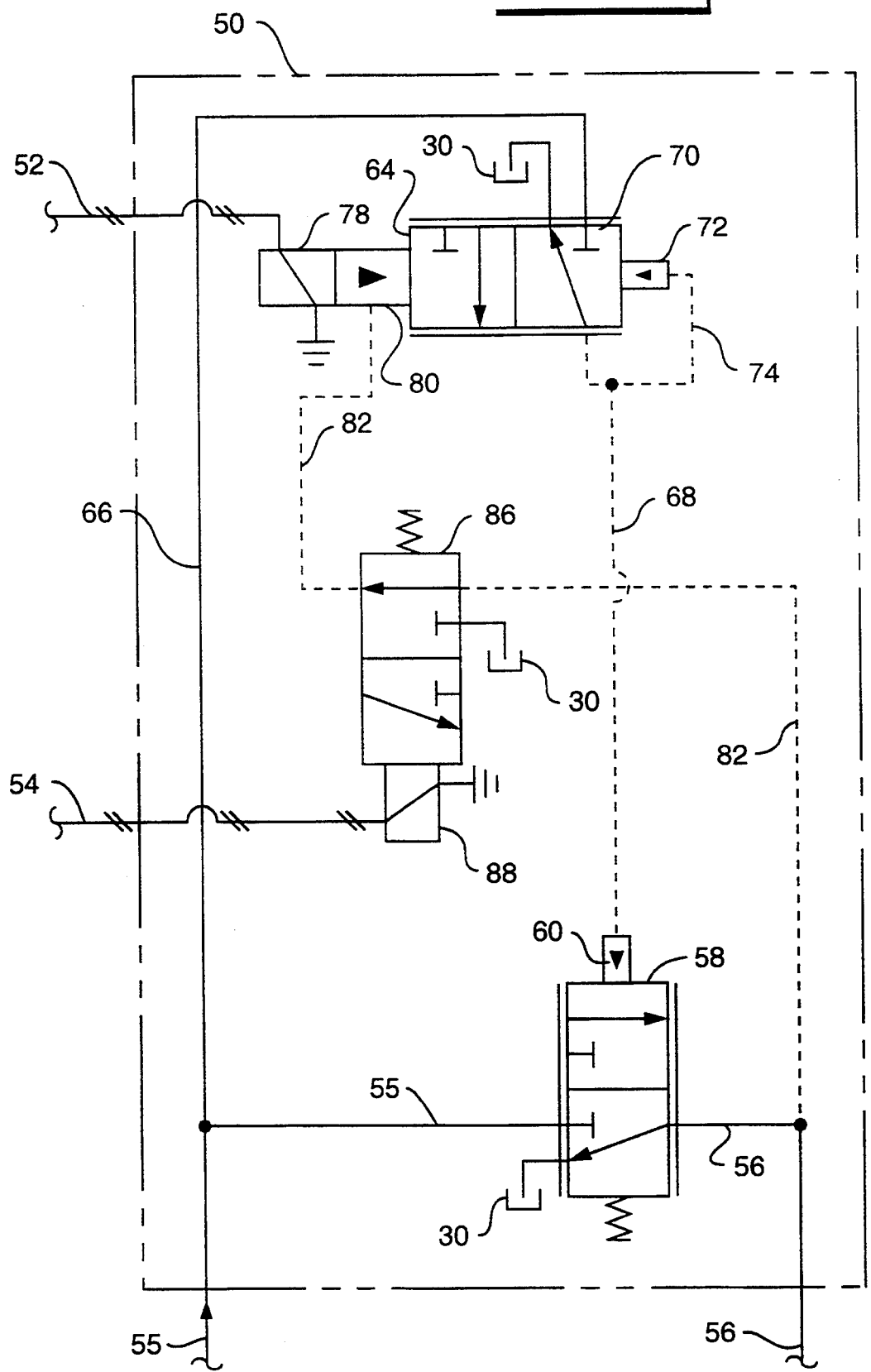
FIG. 2 is a schematic representation of a portion of FIG. 1 more explicitly illustrating the present invention.

Referring to FIG. 2, one of the electro-hydraulic interlock systems 50 from FIG. 1 is illustrated in greater detail. The electro-hydraulic interlock system 50 includes a pilot operated valve 58 interposed between the source of pressurized fluid 28 and one clutch of the plurality of hydraulically actuated speed and directional clutches 46. The pilot operated valve 58 is connected to the source of pressurized fluid by the fluid conduit 55 and is connected to the one hydraulically actuated clutch 46 by the fluid conduit 56. The pilot operated valve 58 is a three-way, two-position valve that is spring biased to a first position at which the fluid conduit 55 is blocked and the fluid conduit 56 is in fluid communication with the reservoir 30. The pilot operated valve 58 has a pressure responsive actuator section 60 which in response to a pilot signal is effective to bias the pilot operated valve to a second operative position at which the source of pressurized fluid 28 is in fluid communication with the one hydraulically actuated clutch 46 through the respective conduits 55,56. The movement of the pilot operated valve 58 between its first and second positions is variably controlled in response to the magnitude of the pilot signal acting on the pressure responsive actuator section 60.

The electro-hydraulic interlock system 50 also includes an electro-hydraulic proportional valve 64 that is interposed between the one hydraulically actuated clutch 46 and the source of pressurized fluid 28. The electro-hydraulic proportional valve 64 is connected to the source of pressurized fluid 28 by the fluid conduit 55 and a fluid conduit 66 and is connected to the pressure responsive actuator section 60 of the pilot operated valve 58 by a fluid conduit 68. The electro-hydraulic proportional valve 64 has a valving element 70 that is movable between a first position at which the fluid conduit 66 is blocked and the fluid conduit 68 is in fluid communication with the reservoir 30 and a second position at which the fluid conduit 66 from the source of pressurized fluid 28 is in fluid communication with the pressure responsive actuator section 60 of the pilot operated valve 58.

The electro-hydraulic proportional valve 58 has a first pressure responsive section 72 that is connected downstream thereof to the conduit 68 by a fluid conduit 74. The first pressure responsive section 72 is effective in response to receiving pressurized fluid from the one hydraulically actuated clutch through the conduit 68 to bias the valving element 70 towards its first position.

An electrical actuator 78 is operatively connected to the electro-hydraulic proportional valve 64 and operative to generate a force proportional to the magnitude of the first electrical control signal being directed thereto through the electrical connection 52 to bias the valving element 70 in opposition to the force generated by the first pressure responsive section 72.

A larger second pressure responsive section 80 is operatively connected to the electro-hydraulic proportional valve 64 and is operative to generate a force that acts on the valving elements 70 in opposition to the force generated by the first pressure responsive section 72. It should be recognized that if the first pressure responsive section and the larger second pressure responsive section are acted upon by a pressure signal of the same magnitude, the resultant force generated by the larger second pressure responsive surface would be higher than the force generated by the first pressure responsive section 72. The larger second pressure responsive section 80 is connected to the one hydraulically operated clutch 46 by a fluid conduit 82 and the fluid conduit 55.

A solenoid operated valve 86 is interposed in the fluid conduit 82 between the larger second pressure responsive section 80 of the electro-hydraulic proportional valve 64 and the fluid conduit 56 connected to the one hydraulically operated clutch 46. The solenoid operated valve 86 is spring biased to a first position at which the pressurized fluid in the one hydraulically actuated clutch 46 is in open fluid communication with the larger second pressure responsive section 80 and a second position at which the pressurized fluid in the one hydraulically actuated clutch 46 is blocked and the larger second pressure responsive section 80 is in open fluid communication with the reservoir 30. A solenoid actuator 88 is operatively connected to the solenoid operated valve 86 and operative in response to receipt of the second control signal through the electrical connection 54 to bias the solenoid operated valve 86 to its second position.

Figure 3:
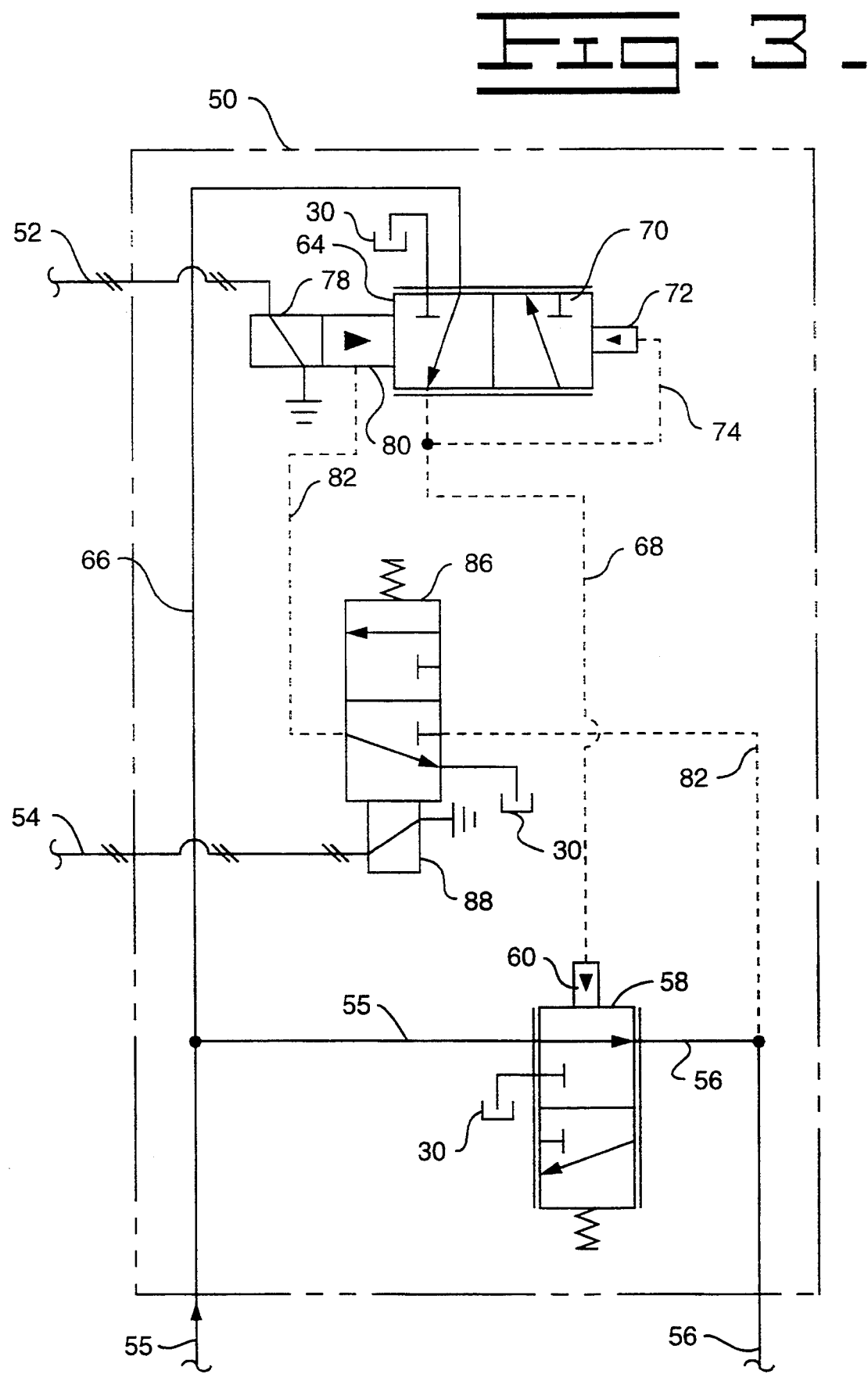
FIG. 3 is a schematic representation of the embodiment of FIG. 2 in an operative position.

Referring to FIG. 3, the electro-hydraulic proportional valve 64 is illustrated in its second operative position following receipt of the first electrical control signal through the electrical connection 52 while the solenoid operated valve 86 is moved to its second position in response to receipt of the second electrical control signal through the electrical connection 54. It should be recognized that the valving element 70 of the electro-hydraulic valve 64 does not immediately move to its second position. The degree of movement is based on the magnitude of the first electrical control signal. In fact, it is desirable to gradually actuate the electro-hydraulic proportional valve 64 which in turn gradually engages the one hydraulically actuated clutch 64. With the electro-hydraulic proportional valve 64 in its second position, the pilot operated valve 58 is urged to its second operative position in response to the pressurized fluid being directed to the pressure responsive actuator section 60. Consequently, pressurized fluid from the source of pressurized fluid 28 is directed across the pilot operated valve 58 to engage the one hydraulically operated clutch 46.

Referring to FIG. 4, in the event of an electrical failure in the control system 10, the solenoid operated valve 86 is spring biased to its first position which connects the pressurized fluid in the fluid conduit 56 to the larger second pressure responsive section 80. The force generated by the pressurized fluid from the fluid conduit 56 acting on the larger second pressure responsive section 80 biases the valving element 70 to its second position. This maintains continuous fluid communication between the source of pressurized fluid 28 and the pressure responsive actuator section 60, thus, maintaining the pilot operated valve 58 in its second position which, in turn, maintains the one fluid actuated clutch 46 in its engaged condition.

It is recognized that various forms of the electro-hydraulic interlock system for a transmission could be utilized without departing from the essence of the invention. For example, the electrical actuator 78 and the solenoid actuator 88 could be responsive to electrical pulses. Likewise, other system parameters could be sensed and directed to the electronic controller 24. Furthermore, additional numbers of hydraulically actuated clutches 46 could be utilized.

INDUSTRIAL APPLICABILITY

In the operation of the electro-hydraulic interlock system as generally illustrated in FIG. 1 and more specifically illustrated in FIGS. 2-4, the electronic control 24 continuously monitors the rotational speed of the shafts 18,20 and 22 through the associated speed sensors 36,40 and 43. When it is desired to engage one of the hydraulically actuated clutches 46, the command input device 32 is moved to one of its operative positions which directs an electrical signal through the electrical connection 34 to the electronic control 24. The electronic control 24 subsequently generates the first and second electrical control signals. The first electrical control signal is directed to the electro-hydraulic proportional valve 64 through the electrical connection 52 to bias the valving element 70 therein towards its second position. Simultaneously, the second electrical control signal is directed to the solenoid operated valve 86 through the electrical connection 54 moving it to its second position which connects the larger second pressure responsive section 80 of the electro-hydraulic proportional valve 64 to the reservoir 30.

The degree of movement of the valving element 70 of the electro-hydraulic proportional valve 64 between its first and second positions is dependant on the magnitude of the first electrical control signal. Therefore, the magnitude of the pressurized fluid in the fluid conduit 68 is directly proportional to the magnitude of the first electrical control signal in the electrical connection 52. The pressurized fluid in the fluid conduit 68 acting on the pressure responsive actuator section 60 of the pilot operated valve 58 moves the pilot operated valve 58 from its first position towards its second position proportional to the magnitude of the pressurized fluid in the fluid conduit 68. Therefore, the pressurized fluid being directed across the pilot operated valve 58 from the source of pressurized fluid 28 to the one hydraulically actuated clutch 46 is proportionally controlled with respect to the magnitude of the first electrical control signal. Consequently, the one hydraulically actuated clutch 46 is progressively engaged as the first electrical control signal increases in magnitude. The fluid pressure acting on the one hydraulically actuated clutch 46 continues to increase until the one hydraulically actuated clutch 46 is fully engaged.

Following full engagement of the one hydraulically actuated clutch 46, the second electrical control signal is interrupted. Consequently, the solenoid operated valve 86 moves to its first position opening fluid communication in the fluid conduit 82 from the one hydraulically actuated clutch 46 to the larger second pressure responsive section 80 of the electro-hydraulic valve 64. The resulting force from the pressurized fluid acting on the larger second pressure responsive section 80 biases the valving element 70 to its second position against the bias of the first pressure responsive section 72 and holds the valving element 70 in its second position.

In the event there is an electrical failure in the electrical connection 54 or a total electrical failure in the system, the solenoid operated valve 86 is maintained in its first spring bias position, thus, maintaining fluid communication between the one hydraulically actuated clutch 46 and the larger second pressure responsive section 80 of the electro-hydraulic proportional valve 64.

Since the electro-hydraulic proportional valve 64 is maintained in its second position, the pressurized fluid from the source of pressurized fluid 28 is continuously maintained at the pressure responsive actuator section 60 of the pilot operated valve 58. Therefore, the pilot operated valve 58 is maintained in its second position which provides continuous pressurized fluid from the source of pressurized fluid 28 to the one hydraulically actuated clutch 46 keeping it in its engaged condition. This ensures that the one hydraulically actuated clutch 46 of the transmission 12 is maintained in the engaged position even in the event of an electrical power failure in the system.

If the operator elects to change from one speed ratio or direction to another, the command input device 32 is moved to another operative position which directs a different electrical signal through the electrical connection 34 to the electronic controller 24. The electronic controller, in turn, cancels the first and second electrical control signals being directed to the electro-hydraulic interlock system 50 controlling the one hydraulically actuated clutch 46 and directs separate first and second electrical control signals to another one of the electro-hydraulic interlock systems 50 to control another one of the hydraulically actuated clutches 46. Each of the electro-hydraulic interlock systems 50 function in the same manner, consequently, no additional comments will be made to each of the other electro-hydraulic interlock systems 50.

In view of the foregoing, it is readily apparent that the electro-hydraulic interlock system 50 of the present invention provides a simple hydraulic arrangement that allows various ones of the plurality of hydraulically actuated speed and directional clutches 46 to be engaged and disengaged efficiently and effectively. Likewise, each of the electro-hydraulic interlock systems 50 illustrated in FIG. 1 maintains the respective ones of the plurality of hydraulically actuated speed and directional clutches 46 in their respective positions in the event of an electrical malfunction in the system.

Other aspects, objects and advantages of the invention can be obtained from a study of the drawings, the disclosure and the appended claims.

I claim:

1. An electro-hydraulic interlock system adapted for use in a control system for a transmission having hydraulically actuated speed and directional clutches, the control system includes an electronic controller receiving energy from a source of electrical energy and producing first and second electrical control signals, a source of pressurized fluid and a reservoir, the electronic controller is operative in response to a command input device to selectively control one of the hydraulically actuated speed or directional clutches in the transmission, the electro-hydraulic interlock system comprising:

a pilot operated valve having a pressure responsive actuator section and when installed in the control system is interposed in flow controlling relationship between the source of pressurized fluid and the one hydraulically actuated clutch;

an electro-hydraulic proportional valve having a valving element operative to control fluid flow thereacross and when installed in the control system is interposed between the source of pressurized fluid and the pressure responsive actuator section of the pilot operated valve and operable in response to a force generated by the first electrical control signal to direct thereacross a pilot signal that is proportional to the first electronical control signal to control movement of the pilot operated valve, the electro-hydraulic proportional valve has a first pressure responsive section responsive during use to the pressurized fluid downstream thereof to bias the valving element in opposition to the force generated by the first electrical control signal and a larger second pressure responsive section that when installed in the control system is selectively responsive to the pressurized fluid in the one hydraulically actuated clutch and operable to bias the valving element in opposition to the force generated by the first electrical control signal; and a solenoid operated valve interposed when installed in the control system between the larger second pressure responsive section of the electro-hydraulic proportional valve and the one hydraulically actuated clutch and selectively movable during use in response to the second electrical control signal from the electronic controller to a position providing open fluid communication between the larger second pressure responsive section and the one hydraulically actuated clutch.

2. The electro-hydraulic interlock system of claim 1 wherein the pilot operated valve is a three-way, two-position valve movable between a spring biased first position at which during use the one hydraulically actuated clutch is blocked from the source of pressurized fluid and is open to the reservoir and a second position at which during use the one hydraulically actuated clutch is in communication with the source of pressurized fluid and blocked from the reservoir.

3. The electro-hydraulic interlock system of claim 2 wherein the solenoid operated valve is movable during use between a spring biased first position at which the larger second pressure responsive section is in open communication with the one hydraulically actuated clutch and a second position at which the larger second pressure responsive section is in communication with the reservoir and blocked from the one hydraulically actuated clutch.

4. The electro-hydraulic interlock system of claim 3 wherein the valving element of the electro-hydraulic proportional valve is movable during use between a first position at which the source of pressurized fluid is in communication with the pressure responsive actuator section of the pilot operated valve and a second position at which the source of pressurized fluid is blocked and the pressure responsive actuator section is open to the reservoir, the valving element is movable during use toward the first operative position in response to the force generated by the first electrical control signal and movable toward the second position in response to the pressure downstream thereof acting on the first pressure responsive section.

5. The electro-hydraulic interlock system of claim 4 wherein during use once the one hydraulically actuated clutch is actuated by the pressurized fluid from the source of pressurized fluid being directed thereto, failure of the supply of electrical energy from the electronic controller results in the one hydraulically actuated clutch remaining actuated due to the solenoid actuated valve being spring biased to its first operative position connecting the pressurized fluid in the one hydraulically actuated clutch to the larger second pressure responsive section, thus, establishing an effective force to hold the valving element in its first position.

* * * * *